United States Patent [19]
Lynch, Jr. et al.

[11] Patent Number: 5,537,714
[45] Date of Patent: Jul. 23, 1996

[54] METAL STUD GROMMET

[75] Inventors: Edward J. Lynch, Jr., Akron; Raymond S. Laughlin, Cuyahoga Falls, both of Ohio

[73] Assignee: Erico International Corp., Solon, Ohio

[21] Appl. No.: 299,548

[22] Filed: Sep. 1, 1994

[51] Int. Cl.$^6$ ................ H02G 3/22; F16L 5/00
[52] U.S. Cl. ................ 16/2; 174/153 G; 411/182
[58] Field of Search ............... 174/152.6, 153 G, 174/65 G; 248/56; 411/182, 339, 508, 913; 16/2

[56] References Cited

U.S. PATENT DOCUMENTS

| | | | |
|---|---|---|---|
| 4,192,477 | 3/1980 | Decky et al. | 248/56 |
| 4,208,944 | 6/1980 | Moryl | 411/182 |
| 4,299,363 | 11/1981 | Datschefski | 114/153 G |
| 4,361,302 | 11/1982 | Lass | 174/153 G |
| 4,656,689 | 4/1987 | Dennis | 16/2 |
| 4,883,319 | 11/1989 | Scott | 297/354 |
| 5,069,586 | 12/1991 | Casey | 411/339 |
| 5,090,644 | 2/1992 | Lenker | 248/56 |
| 5,238,299 | 8/1993 | McKinney | 174/153 G |
| 5,269,640 | 12/1993 | Jonishi | 411/182 |

FOREIGN PATENT DOCUMENTS

| 823722 | 11/1959 | United Kingdom | 16/2 |
|---|---|---|---|

OTHER PUBLICATIONS

Caddy Catalog, pp. 28–29, Metal Stud Punch and Grommet.
Magazine Article "One Size Fits All!", Dec. 1993, Arlington Industries, Inc., p. 17.
Article "Arlington's New Non–Metallic Bushing For Metal Studs", Arlington Industries, Inc., date unknown.
Article "Stud Punches & Insulators", Greenlee Tool Company, date unknown, p. 106.

*Primary Examiner*—W. Donald Bray
*Attorney, Agent, or Firm*—Renner, Otto, Boisselle & Sklar

[57] ABSTRACT

A plastic grommet for use on metal studs in wall construction protecting wires, cabling, conduit, and the like. The grommet also makes the passing of such utilities easier and quieter. The grommet will function singularly or assembled to a clone. The grommet includes a cylindrical body having an enlarged flange on one end with radially projecting spring snaps on the exterior of the body whereby the grommet may be inserted in a sized hole in the web with the hole edge captured between the snaps and flange. On the other side of the flange are diametrically opposed axially projecting spring fingers. The flange also has two diametrically opposed holes, the fingers and holes being positioned so that two grommets can be joined flange-to-flange by axially rotating one with respect to the other. Two such grommets thus assembled on opposite sides of a rectangular or other irregular or pre-punched hole in the stud web capture the web between the flanges.

14 Claims, 1 Drawing Sheet

METAL STUD GROMMET

DISCLOSURE

This invention relates generally as indicated to a metal stud grommet, and more particularly to a plastic grommet which will function singularly in a sized punched hole, or joined to a clone in a rectangular or pre-punched hole.

BACKGROUND OF THE INVENTION

Metal stud grommets have been provided to protect conduit, cabling, or wiring passing through the metal stud from engaging the sharp edge of the hole in the stud web. To install non-metallic sheathed cable or wiring through holes in metal studs without the protection of grommets or bushings is a code violation. Such grommets usually snap into a punched hole and are sized to fit the hole. Such grommets may have a hollow cylindrical body with a flange at one end and spring snaps on the body slightly spaced from the flange, which enables the body to be inserted through the hole until the stud web hole edge snaps behind the spring snaps to be caught between the snaps and flange. The problem with this type of grommet is that it requires a sized round hole, and when inserted it is asymmetrical of the web and of limited length and support.

For larger or irregular holes there has been developed a plastic grommet having body with a larger flange on one end and a corresponding washer which fits over the body to snap behind the spring snaps on the body and clamp the stud web between the washer and larger flange. The washer is tethered to the flange and the hole or opening has to be large enough for the washer by itself to pass through the hole so that the two parts are on opposite sides of the web. If it will not fit, the washer has to be removed by cutting the tether, and if lost, replaced. Moreover, the grommet is still asymmetrical of the web hole and of limited axial length.

It would accordingly be beneficial to have a grommet which could be used to snap quickly in a controlled or round hole in a stud web, or which could be joined to an identical grommet on the opposite side of the web to be secured in a larger or irregular hole, and when assembled to itself, form a longer length grommet which is symmetrically positioned with respect to the web.

SUMMARY OF THE INVENTION

The grommet of the present invention has two uses. In one singular use, the cylindrical body projects through a sized usually circular hole in the stud web and is caught behind ramped spring snap latches projecting radially of the body and a flange on one end of the body. In the other use, two identical grommets are joined to each other flange-to-flange through an irregular or rectangular hole to capture the web between the flanges. The latter use doubles the axial length of the grommet and makes the length symmetrical with the web. In other words, the grommet assembly captures the stud web midway between its ends.

To enable the second use, the grommet is provided with axially projecting latch fingers or prongs which project axially on the opposite side of the flange from the cylindrical body. The flange also has rectangular holes which are circumferentially offset from the latch fingers. The holes and fingers are at an aligned radial and arcuate spacing so that by rotating one of the grommets with respect to another through such spacing, the grommets may be assembled flange-to-flange by inserting the fingers of one through the holes of the other. There are preferably two holes and two fingers with each pair on perpendicular diameters, so that axial rotation of one grommet 90° with respect to the other will enable such assembly. The projecting latch fingers are relatively wide and provided with half arrowhead ramps which snap behind the rectangular holes.

In addition, the flange is enlarged and provided with an annular outer bead. The opposed beads engage and grip the web around the hole. The flanges may flex somewhat like a Belleville spring washer so that the web may actually be spring gripped or sandwiched between the beads. The end of the cylindrical body ° 5 at the flange is provided with radially offset ridges which interlock with the ridges on the opposite grommet when turned 90° to close the cylindrical interior of the aligned grommets to prevent a web edge from entry into the cylindrical envelope of the assembled grommets, preventing any object therein from being damaged by the edge of the web of the metal stud.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

DETAILED DESCRIPTION OF THE PREFERRED EMBODIMENTS

Figure 1:
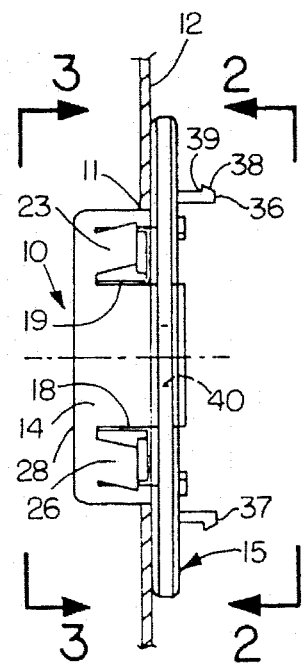
FIG. 1 is a side elevation of a grommet in accordance with the present invention illustrating one manner of use.
Figure 2:
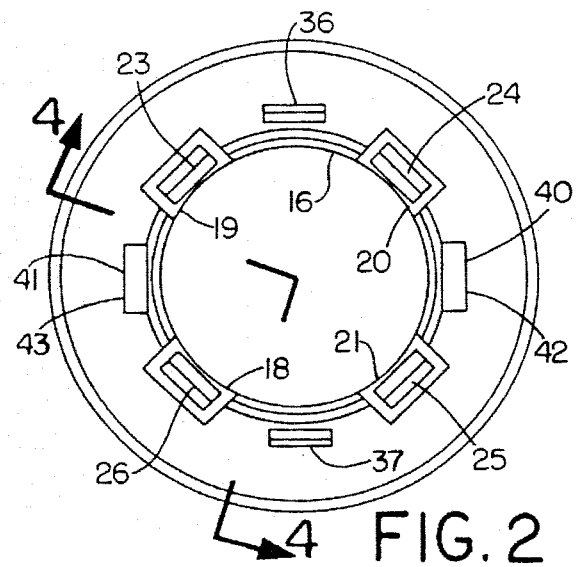
FIG. 2 is an axial elevation of such grommet as seen from the lines 2—2 of FIG. 1.
Figure 3:
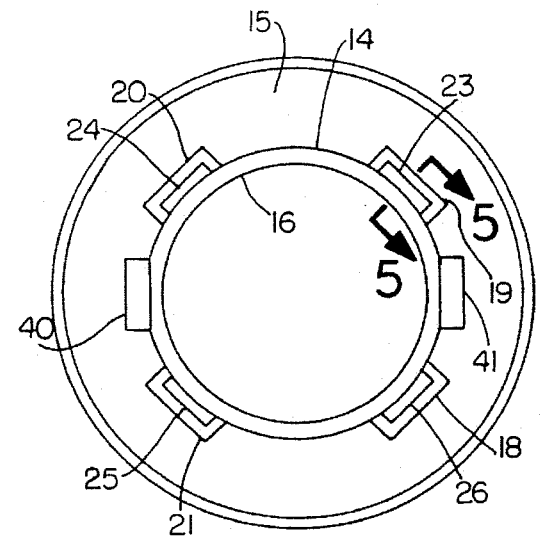
FIG. 3 is an opposite axial elevation as seen from the lines 3—3 of FIG. 1.
Figure 4:
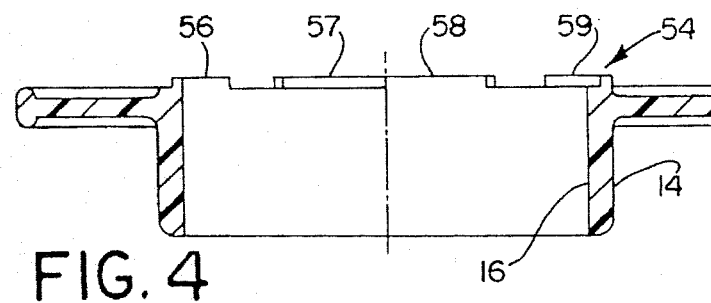
FIG. 4 is an enlarged quarter section taken on the line 4—4 of FIG. 2 illustrating certain shapes of the grommet with background parts omitted.

Referring initially to FIG. 1, there is illustrated a grommet 10 in accordance with the present invention inserted in a hole 11 in the web 12 of a metal stud. The grommet includes a cylindrical body 14 and at one end a radially projecting flange 15. The interior 16 of the grommet seen in FIGS. 2, 3 and 4 is a smooth cylindrical surface and it is through such interior surface and opening that nonmetallic cable, metallic cable, communication cable, control cable, alarm cable, TV cable and conduit may pass. In addition, the interior of the grommet will support water and gas lines. The purpose of the grommet is to protect wires, cabling and cable insulation from damage. It is also to eliminate noise that might be caused by conductors or other objects passing through the metal stud.

The exterior of the cylindrical body is provided with four quadrant spaced openings indicated at 18, 19, 20 and 21 in FIG. 2, which openings extend axially through the flange 15.

Figure 5:
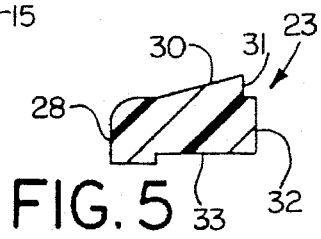
FIG. 5 is an enlarged partial radial section taken from the line 5—5 of Figure 3.

Situated in each respective opening are ramped spring snap latches 23, 24, 25 and 26. The spring ramps are integrally formed with the cylindrical body projecting within the hole from near the projecting end 28 of the body. As seen more clearly in FIG. 5, each snap ramp is like a finger projecting toward the flange within the respective hole. The exterior forms a sloping ramp 30 which terminates in a stop shoulder 31 which projects radially of the grommet. The stop shoulder is spaced from the end 32 of the snap finger. The interior of the finger is flat as indicated at 33.

As seen in FIG. 1, the grommet 10 has been inserted through a sized hole 11 in the stud web 12 and as the grommet is inserted, the hole edge will engage the ramps 30 of the snap latches depressing the snap latches inwardly until the grommet has achieved the position in FIG. 1. At that time, the ramped snap latches spring outwardly with the shoulder 31 snapping behind the interior of the stud web hole edge capturing the stud web between the shoulders and the large flange 15. In the position of FIG. 1, the grommet is locked in the hole and may be used in singular fashion.

However, if the hole is rectangular, somewhat larger, or irregular, the grommet will not easily fit. Also, it is noted that the grommet of FIG. 1 is not symmetrical with the web with the majority of the cylindrical body projecting to the left as seen in FIG. 1.

Projecting axially of the flange 15 on the side of the flange opposite the extending cylindrical body are two diametrically opposed axially projecting snap fingers or prongs seen at 36 and 37. As illustrated, the prongs are in the form of a half arrowhead and include a projecting inclined ramp 38 forming a latch shoulder 39. The two projections 36 and 37 seen in FIG. 2 are 180° apart or diametrically opposed. The ramps face radially outwardly.

Also, in the flange 15 are two diametrically opposed rectangular holes seen at 40 and 41. The outer edges 43 of these holes engage the ramps deflecting the fingers inwardly until the shoulders snap behind such edges locking the parts together. It is noted that the holes 40 and 41 are on a diameter normal to the diameter of the projections. In this manner, one part may be rotated axially 90° and quickly joined to an identical part as seen in FIGS. 6 and 7 flange-to-flange capturing a stud web 50 therebetween.

Referring now additional to FIG. 4, it will be seen that the flange 15 is provided with an outer annular bead 52 which is axially wider than the main portion of the flange. In this manner, when the two grommets are joined flange-to-flange, the web will be captured by contact with the beads and the flanges may actually spring slightly apart to become stressed such as a Belleville washer. In this manner, the web 50 may be spring gripped by the flanges and captured or sandwiched between the two connected grommets.

Also, as seen in FIG. 4, the interior diameter (ID) of the flange includes an axially projecting coupling face 54 opposite the projecting cylindrical body 14 which includes radially offset diametrically opposite ridges 56, 57, 58 and 59. As illustrated by the schematic quarter section of FIG. 4, the diametrically opposite ridges 56 and 59 are radially offset as are the diametrically opposite ridges 57 and 58. Accordingly, when the two grommets are rotated axially 90° with respect to each other the ridges do not interfere with each other but when such rotation occurs, and the two grommets are joined, entry to the interior of the extended grommet is prohibited by such blocking ridges. Accordingly, the edges of a stud hole cannot intrude into the interior of the grommet in the flange-to-flange assembled condition.

Figure 6:
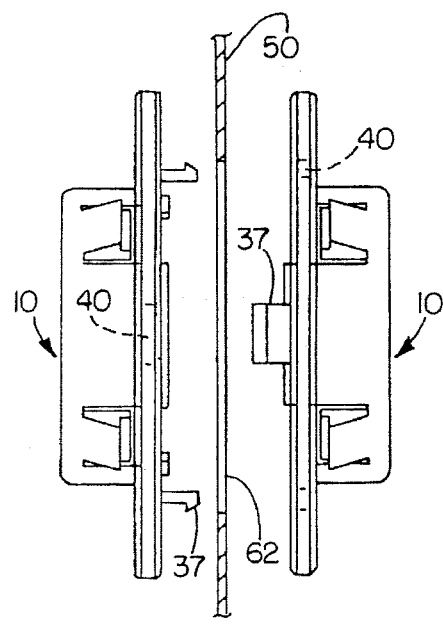
FIG. 6 is a view similar to FIG. 1 but illustrating two of the grommets and another manner of use.
Figure 7:
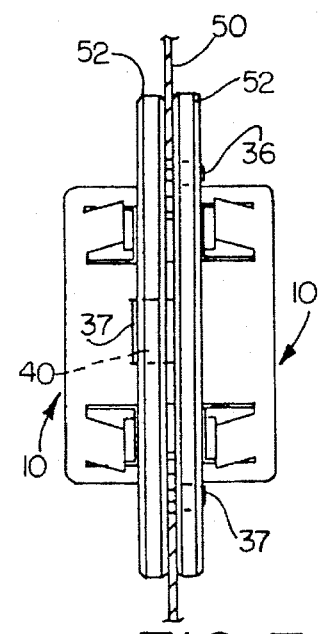
FIG. 7 is a view similar to FIG. 6 but showing the two grommets closed on each other flange-to-flange capturing the stud web therebetween.

As seen in FIG. 6, the hole 62 in the stud web 50 is somewhat larger than the hole 11 in the web 12. The hole may be pre-punched, rectangular or some other shape. Two grommets 10 are positioned on opposite sides of the hole as seen in FIG. 6 but the grommet on the right has been rotated 90° with respect to the grommet on the left. This 90° rotation aligns the half arrowhead projections with the rectangular holes. After rotation, the grommets are simply snapped together as seen in FIG. 7 with the protrusions 37 and 38 of the right hand grommet projecting through the holes 40 and 41 of the left hand grommet. Conversely, the protrusions 36 and 37 of the left hand grommet project through the holes 40 and 41 of the right hand grommet. In this manner, the protrusions and holes snap lock together so that the two grommets are held together at four separate quadrant spaced locations. The connection of the two grommets through the enlarged hole or rectangular hole may actually stress the flanges as the beads engage the web 50 so that the web is gripped with a spring force and sandwiched between the two grommets. The grommets joined, as noted, present a grommet length twice that shown in FIG. 1 and the cylindrical body of the grommet is symmetrical with the stud web 50. It is noted that the tips of the fingers 36 and 37 project only slightly beyond the bead of the adjoining grommet flange leaving the space between the flange and spring snaps 23–26 free. This leaves space for something to be hung therefrom as in FIG. 1, if desired.

The grommet of the present invention may be readily injection molded from a durable yet yieldable plastic material and protects wires, cabling and cable insulation from damage, while also eliminating noise which might be caused by conductors or other objects passing through the metal stud. It can also be used for non-metallic cable, metallic cable, communication cable, control cable, alarm cable, TV cable and conduit, which may either be electrical conduit, or actual water or gas lines.

When used singularly as in FIG. 1, the grommet will function in a controlled punched hole. However, when used flange-to-flange as seen in FIG. 7, the two identical grommets snap together and sandwich the metal stud through an existing hole such as that which may be punched during manufacturing of the stud.

It will be appreciated that the number of axial projections and holes may vary so that the arcuate phase rotation of one with respect to the other need not be 90°. The 90° quadrant spacing or the normal diameters is however preferred. When assembled, the interfitting radially offset ridges on the interior of the flange bar entry of any hole edge. The grommet of the present invention will function independently, or when assembled flange-to-flange with a second identical grommet.

Although the invention has been shown and described with,respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

What is claimed is:

1. A metal stud grommet comprising a cylindrical body having an enlarged radial flange at one end, first latch means on the exterior of said body to trap a stud hole edge between said first latch means and the flange in one use of the grommet, and second latch means projecting axially of the flange away from the body, and a latch hole in said flange arcuately spaced from said second latch means and adapted to mate therewith whereby two said grommets may be joined flange-to-flange by relative axial rotation to align the second latch means of one with the latch hole of the other, in another use of the grommet.

2. A metal stud grommet as set forth in claim 1 including at least two said second latch means, and two said latch holes.

3. A metal stud grommet as set forth in claim 2 wherein said second latch means and said latch holes are diametrically aligned and such diameters are normal to each other so that such arcuate spacing is 90°.

4. A grommet as set forth in claim 3 wherein said radial flange terminates radially in an annular outer bead adapted to grip the web of the stud.

5. A grommet as set forth in claim 4 wherein said grommet terminates at the ID of the flange in axially facing alternately radially offset ridges which close the interior of the grommet when two said grommets are joined flange-to-flange.

6. A grommet as set forth in claim 1 wherein said radial flange terminates radially in an annular outer bead adapted to grip the web of the stud.

7. A grommet as set forth in claim 1 wherein said grommet terminates at the ID of the flange in axially facing alternately radially offset ridges which close the interior of the grommet when two said grommets are joined flange-to-flange.

8. A metal stud grommet comprising a cylindrical body having an enlarged radial flange at one end terminating in an annular bead, first latch means on the exterior of said body to trap a stud hole edge between the latch means and the flange in one use of the grommet, and second latch means projecting axially of the flange away from the body, and a latch hole in said flange spaced arcuately from said second latch means and adapted to mate therewith whereby two said grommets may be joined flange-to-flange by relative axial rotation to align the second latch means of one with the latch hole of the other, in another use of the grommet.

9. A grommet as set forth in claim 8 wherein said grommet terminates at the ID of the flange in axially facing alternately radially offset ridges which close the interior of the grommet when two said grommets are joined flange-to-flange.

10. A grommet as set forth in claim 8 including at least two said second latch means and latch holes.

11. A grommet for a hole in the web of a metal stud comprising a cylindrical body having at one end a radial flange with the cylindrical body projecting slightly beyond said flange at said one end to form an annular coupling face, spring snaps projecting radially from the cylindrical body slightly spaced from said flange on the opposite side of the flange as the coupling face whereby the cylindrical body may be inserted through a hole in the web with the web snapping behind the spring snaps to be caught between the snaps and flange, said flange including an axially projecting snap finger on the same side as said coupling face, and a catch opening arcuately spaced from said snap finger adapted to receive said snap finger, whereby two grommets may be joined coupling-face to coupling-face by relative axial rotation to align the snap finger on one with the catch opening of the other.

12. A grommet as set forth in claim 11 wherein said grommet coupling face includes axially facing alternately radially offset ridges which close the interior of the grommet when two said grommets are joined coupling-face to coupling-face.

13. A grommet as set forth in claim 11 wherein said radial flange terminates radially in an annular outer bead adapted to grip the web of the stud when two grommets are joined as aforesaid.

14. A grommet as set forth in claim 11 including paired snap fingers and paired catch openings, each pair being on normal diameters.

* * * * *